(No Model.)
J. M. SILL.
TRUCK.
No. 451,780.        Patented May 5, 1891.
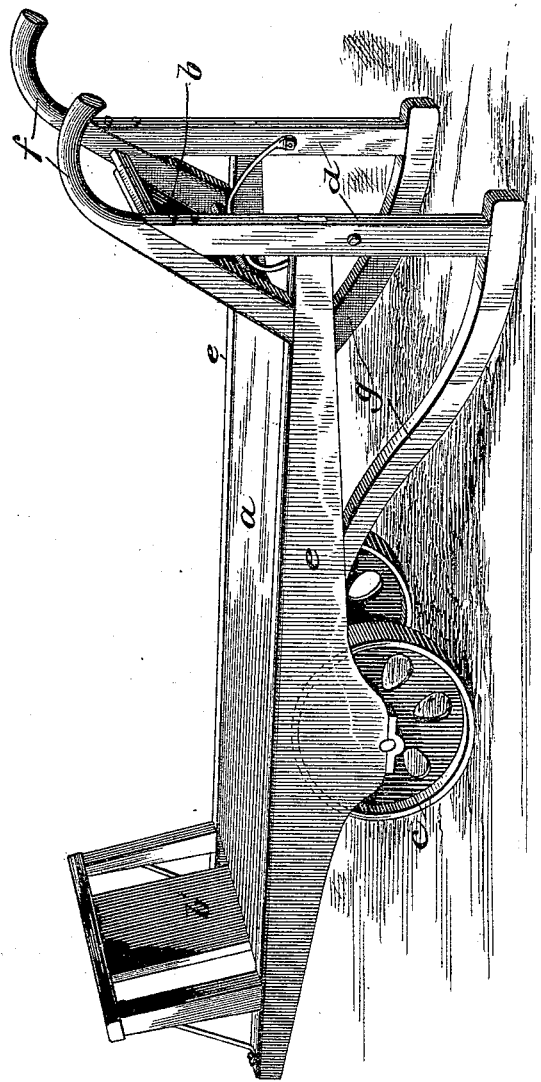
WITNESSES:
Fred G. Dieterich
Amos W. Hart
INVENTOR:
J. M. Sill.
BY
ATTORNEYS

UNITED STATES PATENT OFFICE.

JOSEPH M. SILL, OF TOWANDA, PENNSYLVANIA, ASSIGNOR OF ONE-HALF TO GEORGE A. DAYTON, OF SAME PLACE.

TRUCK.

SPECIFICATION forming part of Letters Patent No. 451,780, dated May 5, 1891.

Application filed November 10, 1890. Serial No. 370,981. (No model.)

*To all whom it may concern:*

Be it known that I, JOSEPH M. SILL, of Towanda, in the county of Bradford and State of Pennsylvania, have invented a new and useful Improvement in Trucks, of which the following is a specification.

My invention is an improved two-wheeled hand-truck which is particularly adapted for use in warehouses for handling seed, grain, and flour in bags.

The object I have had in view is such a construction, arrangement, and combination of parts as will enable the truck to be produced at minimum cost, as well as adapt it to occupy the least amount of floor-space, and also increase its strength at certain points, and its adaptability for convenient use.

In the accompanying drawing I have represented a perspective view of my improved truck.

The frame of the truck is constructed almost entirely of wood. It has a close platform $a$, outwardly-inclined end racks $b\ b'$, a single pair of wheels $c$, and a single pair of legs $d$. The side bars $e$ of the frame extend beyond the points of attachment of the racks $b\ b'$, and at the rear end of the truck they are connected with the legs $d$ by a tenon-and-mortise joint, the legs being extended upward and bolted to the side bars $f$ of the rear rack $b$, so as to serve as supports and braces for the latter as well as tension or lifting bars for raising the adjacent end of the truck. The legs thus subserve a threefold purpose, and the same is true of the side bars $e$ of the rack $b$, which are extended upward and curved rearwardly to form handles for use in propelling and guiding the truck. The handles are thus a mere adjunct or continuation of the frame of the rack, which subserves economy of manufacture. The lower ends of the legs $d$ rest on and are rigidly secured to curved wooden braces $g$, which extend forward and are bolted to the under side of the bars $e$. By this construction and arrangement of said braces they serve as runners which may slide on the floor when the loaded truck is suddenly stopped, thus preventing the sudden arrest of motion that might result in breaking the legs. The bearings of the axle are attached to the downwardly-extended portions of the side bars $e$ at points forward of the center, so that the rear end of the truck overbalances the front. The wheels are arranged beneath the platform $a$ and between the side bars $e$, so that they are out of the way, which is greatly preferable to arranging them outside the bars $e$, whereby they would practically increase the width of the truck. The racks, legs, and leg-braces are also arranged flush with the side bars $e$, so that the truck may be placed close alongside a platform or other object, as is often required for convenience in loading and unloading.

What I claim is,—

The improved warehouse-truck having wheels centrally arranged, the parallel side bars $e\ e$, forming part of the platform and extended, as specified, the inclined rear rack $b$, having side bars extended and curved to form handles, as shown, the vertical legs $d\ d$, connected centrally with the extended ends of said side bars and supporting the handles, and the braces $g\ g$, attached beneath the side bars and legs, all as shown and described.

JOSEPH M. SILL.

Witnesses:
G. S. LITTLE,
W. B. LAYTON.